U S 0 0 5 4 8 4 5 8 2 A

United States Patent [19]
Lee

[11] Patent Number: 5,484,582
[45] Date of Patent: Jan. 16, 1996

[54] PROCESS FOR AMMONIA RECOVERY IN AMMONIA PRODUCTION

[76] Inventor: Jing M. Lee, 11602 Blair Meadow, Stafford, Tex. 77477

[21] Appl. No.: 144,186

[22] Filed: Oct. 27, 1993

[51] Int. Cl.$^6$ .................................................. C01C 1/04
[52] U.S. Cl. .............................. 423/359; 62/20; 422/148
[58] Field of Search .................................. 62/20; 423/359

[56] References Cited

U.S. PATENT DOCUMENTS 4,594,333   6/1986   Parrish ................................. 423/359

*Primary Examiner*—Wayne Langel

[57] ABSTRACT

A process and unit for the recovery of ammonia in ammonia production are disclosed. All or a portion of a high pressure liquid ammonia product stream is introduced into a syngas makeup stream to produce a mixed vapor-liquid refrigeration medium for condensing ammonia from a synthesis loop product stream. Following the product stream ammonia condensation step, the vapor component of the mixed vapor-liquid stream is compressed and cooled for condensing ammonia therefrom. Liquid ammonia separated from the low pressure mixed vapor-liquid stream can be withdrawn as a low pressure liquid ammonia product. An ammonia-lean makeup gas is then combined with the ammonia-containing product recycle gas stream from the synthesis loop and further compressed. The process preferably includes recycle of all or a portion of the low pressure liquid ammonia product as a supplemental refrigerant. A high pressure, ammonia-lean syngas vapor stream obtained following separation of the high pressure ammonia condensate can be used as a process cooling medium for chilling the syngas makeup stream and syngas stream. In such a manner, both ammonia and syngas compression can be consolidated in a single syngas compressor and the use of an ammonia refrigeration compressor can be eliminated.

21 Claims, 1 Drawing Sheet

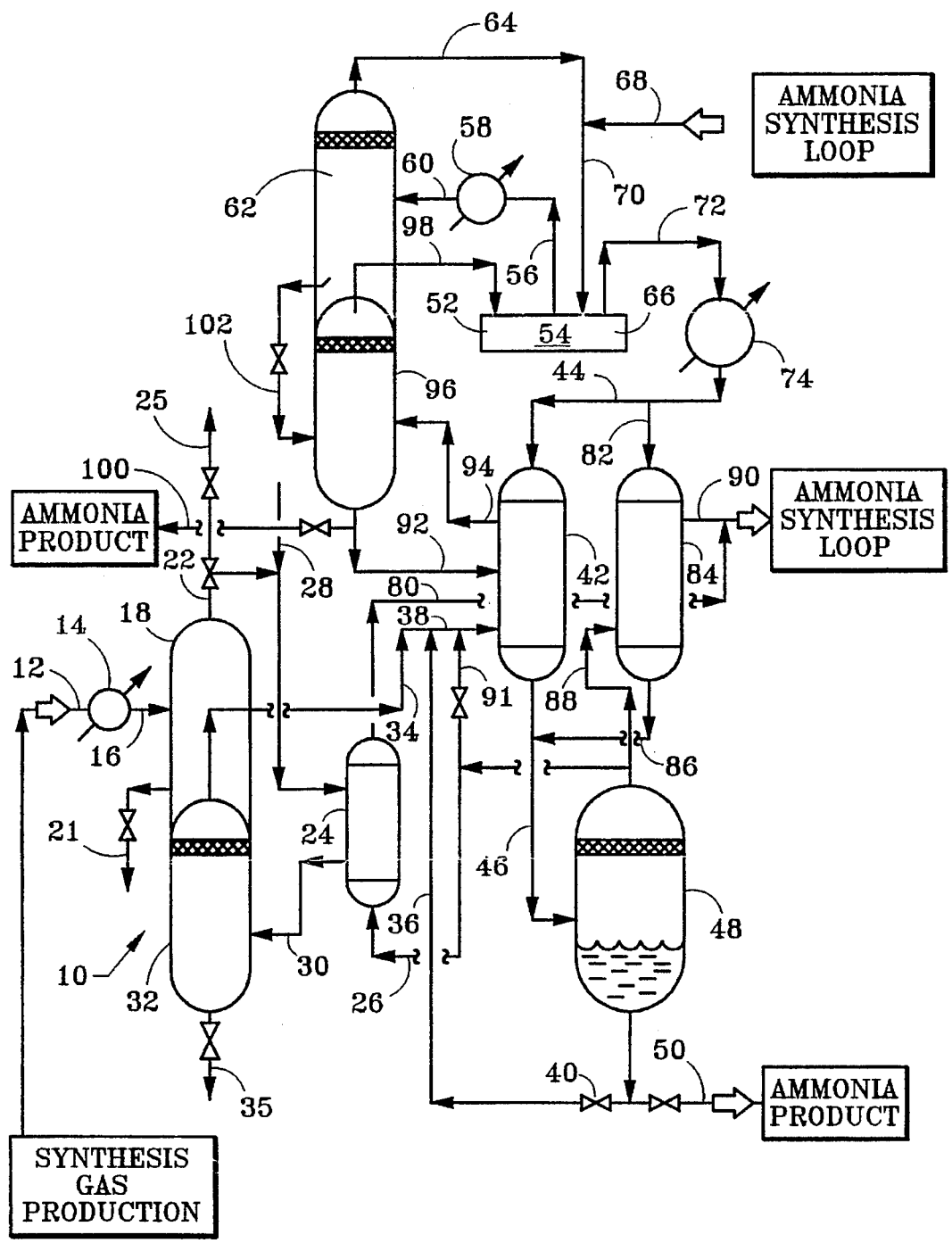

5,484,582

1

PROCESS FOR AMMONIA RECOVERY IN AMMONIA PRODUCTION

FIELD OF THE INVENTION

The present invention relates to a process for ammonia recovery in ammonia production wherein ammonia is condensed by heat exchange against a mixed vapor-liquid refrigerant formed by introducing excess liquid ammonia condensate into synthesis makeup gas.

BACKGROUND OF THE INVENTION

Ammonia production by the Haber-Bosch process is well known in the art. The process generally involves the production of a synthesis gas in a synthesis gas train and subsequent conversion of the synthesis gas to ammonia in a continuous synthesis loop. In the synthesis gas train, a hydrocarbon feedstock is desulfurized, reformed using steam and air, and suitably purified to produce a synthesis makeup gas comprising nitrogen and hydrogen at approximately stoichiometric proportions at a pressure between 2 and 7.6 MPa. In the synthesis loop, a portion of the synthesis gas is reacted over a suitable catalyst, typically iron-based, in an ammonia converter. Ammonia is separated from the unreacted (recycle) gas and makeup gas is added for return to the synthesis loop except for a small portion which is typically removed as a purge stream to control the concentration of inert components. Prior to reaction, the recycle gas is recompressed to the pressure of the ammonia synthesis loop, generally between 10 and 22.0 MPa depending on the particular process, and preheated.

Ammonia is generally recovered from the unreacted gas by condensation in an ammonia recovery loop. Hot reaction effluent is cooled in stages, first against boiler feed water for heat recovery in steam generation and reactor feed preheat units, followed by additional water cooling and chilling against an ammonia refrigerant to a temperature less than 0° C. The recovery loop generally includes a low pressure ammonia refrigeration system made up of a multistage ammonia compressor and a water cooled condenser as is well known in the art. Following condensation, the ammonia condensate product is typically let-down to the pressure of the ammonia refrigeration system to flash out dissolved inert gases. A depressurized ammonia condensate is then removed as product for storage or other use.

SUMMARY OF THE INVENTION

By introducing excess ammonia condensate into a makeup gas upstream of a synthesis loop compression step and using the mixed vapor-liquid ammonia stream thus formed as refrigerant for an ammonia condensation step, the compression for the ammonia refrigeration system can be supplied by the synthesis loop compressor. In such a manner, a separate ammonia compression step and the conventionally associated ammonia refrigeration system can be eliminated.

In one embodiment, the present invention provides a method for recovering ammonia in ammonia production. In step (a), a liquid ammonia stream is introduced into a syngas makeup stream to form a mixed vapor-liquid ammonia stream. In step (b), a high pressure, ammonia-containing syngas stream is cooled against the mixed vapor-liquid ammonia stream to form ammonia condensate in the syngas stream and vaporize ammonia in the mixed vapor-liquid stream. In step (c), liquid ammonia is separated from the mixed vapor-liquid ammonia stream from step (b) to form an ammonia stream and a syngas compressor feed stream. In step (d), the syngas compressor feed stream and a syngas product stream from the ammonia synthesis loop are compressed to form the high pressure, ammonia-containing syngas stream for feed to the cooling step (b). In another preferred step (e), ammonia condensate is separated from the syngas stream from cooling step (b) to form an ammonia-lean syngas stream for feed to an ammonia synthesis loop, and a liquid ammonia stream for the introduction step (a). The steps (c) and (d) can comprise: (1) separating a first portion of ammonia as condensate from the mixed vapor-liquid ammonia stream from step (b) to form a low pressure vapor stream; (2) compressing the low pressure vapor stream from step (1) to form an intermediate pressure stream; (3) cooling the intermediate pressure stream from step (2) to form ammonia condensate; (4) separating ammonia condensate from the cooled intermediate pressure stream to form an intermediate pressure vapor stream; (5) introducing ammonia-containing syngas from the ammonia synthesis loop into the intermediate pressure vapor stream from step (4); and (6) compressing the combined stream from step (5) to a pressure suitable for ammonia condensation in step (b). The method can also include the step of recovering a liquid ammonia product as a portion of the ammonia stream from steps (e) and (c). In a further step (f), a syngas makeup stream for the introduction step (a) is preferably cooled in heat exchange with the ammonia-lean syngas stream from step (e) which becomes heated for feed to the synthesis loop.

In a preferred embodiment, at least a portion of the ammonia stream from step (c) is recycled as a supplemental cooling medium to the cooling step (b). Ammonia is condensed from a portion of the high pressure ammonia-containing syngas stream from step (d) by heat exchange against the ammonia-lean syngas stream from step (e). Water is separated from a raw syngas makeup stream to form the syngas makeup stream for cooling in step (f). The water separating steps can include: (1) cooling the raw syngas makeup stream to substantially condense water vapor and produce a water-lean makeup stream; (2) contacting the water-lean stream from step (1) with aqueous ammonia, liquid ammonia or loop syngas prior to chilling; and (3) separating aqueous ammonia from the mixture from step (2) to produce an essentially water-free low temperature makeup gas stream for the ammonia introduction step (a).

In another embodiment, the present invention provides an ammonia recovery unit in an ammonia production plant. An ammonia injection line is provided for introducing a liquid ammonia stream into a syngas makeup stream to form a mixed vapor-liquid refrigerant stream. A high pressure condenser is provided for cooling a high-pressure, ammonia-containing syngas against the mixed vapor-liquid refrigerant for producing ammonia condensate in the syngas stream and vaporizing ammonia in the mixed vapor-liquid stream. A high pressure separator is provided for separating ammonia condensate from the high pressure syngas stream and producing an ammonia-lean syngas stream for feed to an ammonia synthesis loop and a liquid ammonia stream for supply to the ammonia injection line. A low pressure separator is provided for recovering the refrigerant stream from the high pressure condenser and separating ammonia therefrom to produce an ammonia stream and a compressor feed stream. A syngas compressor is provided for compressing the syngas compressor feed stream and a syngas product stream from the synthesis loop to produce the high pressure, ammonia-containing syngas stream for feed to the high pressure condenser. The low pressure separator and syngas compressor can comprise a first ammonia knock-out drum for receiving the mixed vapor-liquid stream from the high pressure condenser to separate a first portion of ammonia as condensate therefrom and produce a low pressure vapor stream. The low pressure vapor stream from the first ammonia knockout drum can be compressed at a low pressure compression stage to form an intermediate pressure stream. The intermediate pressure stream can be cooled by an intercooler. A second ammonia knock-out drum is provided for receiving the intermediate pressure stream from the intercooler to separate ammonia condensate therefrom and form an intermediate vapor stream. The intermediate vapor stream from the second ammonia knock-out drum can be combined with ammonia-containing recycle syngas from the ammonia synthesis loop to form a combined syngas stream. The combined syngas stream can be compressed by a high pressure compression stage to a pressure suitable for ammonia condensation in the high pressure condenser. Lines are preferably provided for recovering a liquid ammonia product as a portion- of the ammonia stream from the high pressure separator and the low pressure separator. A heat exchanger is preferably provided for chilling the syngas makeup stream before ammonia injection in heat exchange with the syngas vapor stream from the high pressure separator for feed to the synthesis loop.

In a preferred embodiment, the present ammonia recovery unit preferably includes a recycle line for recycling at least a portion of the ammonia stream from the low pressure separator as a supplemental cooling medium in the high pressure condenser. A secondary high pressure condenser is preferably provided for condensing ammonia from a portion of the high pressure, ammonia-containing syngas stream by heat exchange with the chilled ammonia-lean syngas stream from the high pressure separator. A line is preferably provided for the condensate-containing syngas from the secondary high pressure condenser to the high pressure separator. A water separation unit is preferably provided for separating water from a raw syngas makeup stream to form the syngas makeup stream for feed to the heat exchanger. The water separation unit preferably includes an upstream cooler for cooling the raw syngas to substantially condense water vapor and produce a makeup stream of reduced water content. An aqueous ammonia injection line is preferably provided for injecting aqueous ammonia into the makeup stream from the upstream cooler. An aqueous ammonia separator is preferably provided for separating aqueous ammonia from the makeup stream and producing an essentially water-free, low temperature syngas makeup stream for feed to the heat exchanger.

BRIEF DESCRIPTION OF THE DRAWING

The FIGURE is a schematic flow diagram of the ammonia recovery process of the present invention.

DETAILED DESCRIPTION OF THE INVENTION

In the present process, refrigeration required for ammonia recovery in an ammonia production plant can be obtained by introducing excess cold ammonia condensate into an ammonia synthesis makeup gas having a low ammonia partial pressure. In such a manner, an ammonia synthesis compressor can be used to supply all the necessary compression thus eliminating the need for a separate ammonia compressor and associated ammonia refrigeration system. Consolidation of compression in a single higher capacity compressor unit enhances compression efficiency for a given plant capacity. In addition, higher efficiency centrifugal compressors can be used in smaller capacity plants because compression consolidation boosts the compressor size into the region wherein a centrifugal compressor can be used. Thus, smaller capacity plants can use more efficient centrifugal compressors where it had previously been impractical. Furthermore, mechanical design of a synthesis gas compressor is less severe because the addition of ammonia to the makeup gas increases the average molecular weight of the gas being compressed. The present ammonia recovery process is adaptable to different ammonia synthesis designs and operating pressures.

Referring to the FIGURE, a raw ammonia syngas makeup stream produced in a syngas production train (not shown) is directed through line 12 to an ammonia recovery process 10 of the present invention. As is well known, the makeup stream comprises a stoichiometric mixture of hydrogen and nitrogen at an elevated temperature and pressure. The rate of the raw makeup stream is about equal to the rate of ammonia production plus synloop purge in a continuous ammonia synthesis loop (not shown).

Since the raw makeup stream 12 generally contains water vapor which can condense and freeze over the course of the present process, water must be removed prior to stream chilling. While any known dehydration method can be used, water in the raw makeup stream is conveniently removed by condensation. The raw makeup stream is, therefore, preferably directed through line 12 to a cooler 14 wherein the stream is cooled to a temperature suitable for condensing a bulk of the water vapor by an exchange of heat against a cooling medium such as cooling water or air. A cooled makeup stream having entrained water condensate is directed through line 16 to a water knock-out drum 18 wherein water condensate is separated. Accumulated water condensate is removed from the drum 18 through line 21.

A water-lean makeup stream is withdrawn from the drum 18 through line 22 for further cooling in a chiller 24 by an exchange of heat against a portion of a chilled, high pressure, ammonia-lean syngas stream. The high pressure, ammonia-lean syngas stream is obtained following separation of ammonia from a synthesis loop product stream. The high pressure, ammonia-lean syngas stream is preferably directed through line 26 to a tube side of the makeup gas chiller 24 at a sufficient rate to effect a temperature approach in the chiller 24 within about 5°–10° C. of the ammonia-lean syngas stream. However, prior to cooling in the chiller 24, a small quantity of aqueous ammonia is preferably injected through line 28 into the water-lean makeup stream to lower the freezing point of the makeup stream to the chiller 24. Alternatively, the freezing point depressant can be liquid ammonia or loop syngas. A chilled syngas makeup stream is then directed through line 30 to an aqueous ammonia knock-out drum 32 wherein the aqueous ammonia is separated from the syngas makeup stream and an essentially water-free syngas makeup stream is removed in line 34. An aqueous ammonia stream can be removed from the drum 32 through line 35.

In the practice of the present invention, all or a portion of a relatively higher pressure liquid ammonia stream produced as a product by the process 10 of the present invention is introduced through an injection line 36 into the relatively lower pressure syngas makeup stream in line 34. The makeup stream 34 has a low ammonia partial pressure and the introducing step lowers the stream temperature to produce a mixed vapor-liquid refrigerant stream 38 suitable for use as a refrigeration medium for ammonia condensation. A sufficient amount of liquid ammonia is introduced to the make-up gas stream to serve as a refrigerant for subsequent ammonia condensation. As a rule of thumb, each mole percent increase in ammonia concentration in the vapor will lower the temperature of the mixed vapor-liquid stream by about 6.7° C. Ammonia condensate is introduced into the syngas makeup stream 34 to give a mixed vapor-liquid stream having an ammonia concentration of from about 1 percent by mole up to the saturation concentration in the vapor, but preferably from about 3–4 percent by mole up to the saturation concentration in the vapor for the initial addition. The ammonia injection line 36 typically has a let-down valve 40 to control the ammonia introduction rate.

The refrigerated mixed vapor-liquid stream 38 is preferably countercurrently directed to the shell side of a primary high pressure ammonia condenser 42. A high pressure, ammonia-containing syngas stream comprising product gas from the ammonia synthesis loop and makeup gas compressed to the operating pressure of the ammonia synthesis loop is preferably countercurrently directed through line 44 to the tube side of the condenser 42. As the heat exchange process takes place, liquid ammonia in the mixed vapor-liquid makeup stream refrigerant becomes vaporized to saturate the vapor portion of a syngas makeup stream exiting the condenser 42. A chilled syngas stream containing entrained ammonia condensate exits the condenser tube side and is directed through line 46 to a high pressure vapor-liquid separator 48 wherein the ammonia condensate is substantially separated from the syngas vapor. A syngas vapor stream of reduced ammonia content is sent to the ammonia synthesis loop. A portion of the ammonia condensate accumulated in the high pressure separator 48 is removed as a cold liquid ammonia product stream through line 50. The remainder is supplied through line 36 for introduction into the low pressure syngas makeup stream as mentioned above.

A warmed mixed vapor-liquid ammonia stream exits the shell side of the high pressure condenser 42 and the separated vapor is fed to a low pressure compression stage 52 of a multistage ammonia synthesis compressor 54 for compression to an intermediate pressure suitable for substantially condensing ammonia therefrom using cooling water, air or similar inexpensive cooling medium. An intermediate pressure stream is discharged from the compressor first stage 52 through line 56 for feed to an intercooler 58 wherein ammonia is condensed. An intermediate pressure stream containing condensed ammonia is passed through line 60 to a low pressure interstage vapor-liquid separator 62 wherein liquid ammonia is recovered as a relatively warm ammonia stream. A syngas makeup vapor stream which is substantially ammonia-lean is removed from the interstage separator 62 through line 64 for feed to a high pressure compression stage 66 of the synthesis compressor 54. Before further compression, however, an ammonia-containing synthesis loop recycle stream is introduced through line 68 into the ammonia-lean makeup stream 64 and a combined stream is fed to the compressor stage 66 through line 70.

The compressor high pressure stage 66 compresses the combined ammonia-containing syngas stream 70 to a pressure suitable for ammonia synthesis as well as for condensing ammonia by heat exchange against the refrigerated mixed vapor-liquid stream. A high-pressure, ammonia-containing syngas stream in line 72, however, is first cooled initially by heat exchange against a cooling medium such as water or air in a cooler 74. The cooled, high-pressure, ammonia-containing syngas stream is then directed through line 44 to the high pressure ammonia condenser 42 as described above.

Prior to feed to the ammonia synthesis loop, the chilled, high pressure, ammonia-lean syngas vapor stream recovered in the high pressure separator 48 can be used as a cooling medium for ammonia condensation to recover a portion of the refrigeration and warm the vapor feed to the ammonia synthesis loop. As a result, syngas vapor removed from the separator 48 is preferably directed through line 26 as a cooling medium to the make-up gas chiller 24. A heated, high pressure, ammonia-lean syngas stream is directed to the ammonia synthesis loop through line 80.

In a preferred embodiment, a major portion, preferably 60–90 percent of the high pressure, ammonia-lean syngas vapor stream from the high pressure separator 48 is also used as a supplemental refrigeration medium for condensing ammonia from the high pressure, ammonia-containing syngas stream. A portion of the high pressure, ammonia-containing stream in line 44, generally a minor portion, is preferably fed through line 82 to a secondary high pressure ammonia condenser 84. A chilled, high pressure syngas stream containing ammonia condensate is then directed through line 86 for feed to the high pressure separator 48 and recovery of the cold liquid ammonia product stream and the high pressure, ammonia-lean syngas vapor stream. A side stream of the high pressure, ammonia-lean syngas stream enters the secondary condenser 84 through line 88 and a heated ammonia-lean syngas stream exits the condenser 84 through line 90 for feed to the ammonia synthesis loop. If desired, a side stream of the high pressure, ammonia-lean syngas stream from the high pressure separator 48 can be introduced into the refrigerated mixed vapor-liquid stream 38 through line 91 for maintaining a refrigeration balance.

As another preferred embodiment, a portion or all of the warm liquid ammonia is recycled to the primary high pressure ammonia condenser 42 through line 92 as a supplemental refrigeration medium. The liquid ammonia recycle stream in line 92 is preferably injected into the shell-side mixed-vapor stream relatively high on the primary condenser 42 to ensure sufficient cooling at this section of the condenser 42. Residual ammonia liquid present in the warm mixed vapor-liquid stream exiting the condenser 42 through line 94 is preferably separated from the mixed vapor-liquid stream in an ammonia knock-out drum 96 prior to compression in the low pressure compression stage 52. A substantially condensate-free, mixed-vapor stream is then directed through line 98 to the compressor 54. Ammonia condensate, not recycled can be drawn off as a warm liquid ammonia product in line 100. Ammonia condensate accumulating in the interstage separator 62 is let-down to the pressure of the ammonia knock-out drum 96 through line 102.

Proportions of ammonia condensate taken either as warm liquid product, cold liquid product or both will depend on the type of ammonia product required.

The present invention can be further illustrated by reference to the following examples.

EXAMPLE

The ammonia recovery process of the present invention as shown in the FIGURE was calculated assuming that about 25 percent of the chilled, ammonia-lean syngas from the high pressure (HP) separator 48 is directed through line 26 to the makeup gas chiller 24 (tube side) and about 75 percent is directed through line 88 to the secondary HP ammonia condenser 84 (shell side). Similarly, the high pressure, ammonia-rich syngas from the compressor discharge 72 was assumed to be a split 75/25 between the primary HP condenser 42 and the secondary HP condenser 84 (tube sides).

TABLE

| Process Stream | Press. (MPa) | Temp. (°C.) | NH₃ (mol % in vapor phase) |
|---|---|---|---|
| Make-up gas (line 22) | 3.4 | 38 | 0 |
| Exit (shell side) of makeup gas chiller 24 (line 30) | 3.38 | −15 | 0.1 |
| mixed vapor-liquid ammonia stream (line 38) | 3.38 | −32 | 3.2 |
| Inlet (tube side) of the HP ammonia condenser 42 (line 44) | 10.65 | 38 | 15.6 |
| Exit (shell side) of the HP ammonia condenser 42 (line 94) | 3.33 | 35 | 47 |
| Discharge of compressor low pressure stage 52 (line 56) | 10.5 | 173 | 47 |
| Exit of the interstage cooler 58 (line 60) | 10.5 | 38 | 17 |
| Exit of the interstage separator 62 (line 64) | 10.45 | 41 | 17 |
| Inlet to the HP compressor stage 66 (line 70) | 10.45 | 40.3 | 17 |
| Discharge of the HP compression stage 66 (line 72) | 10.95 | 45.8 | 17 |
| Exit of the water cooled exchanger 74 (line 44) | 10.9 | 38 | 15.6 |
| Exit (tube side) of the HP ammonia condenser 42 (line 46) | 10.83 | −25 | 2.2 |
| Exit (tube side) of the makeup gas chiller 24 (line 80) | 10.75 | 30 | 2.2 |
| Ammonia converter inlet | 10.7 | 400 | 2.2 |
| Ammonia converter discharge | 10.6 | 430 | 17 |
| Synloop recycle gas (line 68) | 10.45 | 41 | 17 |

The calculation also assumes all of the warm ammonia condensate in the knock-out drum 96 is recycled as cooling medium through line 92 to the HP ammonia condenser 42 (upper section). Cold ammonia product is withdrawn from the HP separator 48 via line 50. Simulation stream conditions are presented in the Table.

The present ammonia recovery method and unit are illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

I claim:

1. A process for ammonia recovery in an ammonia plant, comprising the steps of:
   (a) introducing an excess liquid ammonia stream into a syngas makeup stream to form a mixed vapor-liquid refrigerant stream;
   (b) cooling a high pressure, ammonia-containing syngas stream against the mixed vapor-liquid stream to form ammonia condensate in the syngas stream and vaporize ammonia in the mixed vapor-liquid stream;
   (c) separating liquid ammonia from the mixed vapor-liquid stream from step (b) to form a liquid ammonia stream and a syngas compressor feed stream; and
   (d) compressing the syngas compressor feed stream from step (c) and a syngas recycle stream from the ammonia synthesis loop to form the high pressure, ammonia-containing syngas stream for cooling in step (b).

2. The method of claim 1, including the step of:
   (e) separating the ammonia condensate from the syngas stream from step (b) to form a syngas stream of reduced ammonia content for feed to an ammonia synthesis loop and a liquid ammonia stream for introduction in step (a).

3. The method of claim 2, wherein steps (c) and (d) comprise the steps of:
   (1) separating a first portion of ammonia as condensate from the mixed vapor-liquid stream from step (b) to form a low pressure vapor stream;
   (2) compressing the low pressure vapor stream from step (1) to form an intermediate pressure stream;
   (3) cooling the intermediate pressure stream from step (2) to form ammonia condensate;
   (4) separating ammonia condensate from the cooled intermediate pressure stream to form an intermediate pressure vapor stream;
   (5) introducing ammonia-containing syngas from the ammonia synthesis loop into the intermediate pressure vapor stream from step (4); and
   (6) compressing the ammonia-containing syngas from step (5) to a pressure suitable for ammonia condensation in step (b).

4. The method of claim 2, including the step of recycling at least a portion of the ammonia stream from step (c) as a supplemental cooling medium in the cooling step (b).

5. The method of claim 2, including the step of condensing ammonia from a portion of the high pressure, ammonia-containing syngas stream from step (d) by heat exchange against the syngas stream of reduced ammonia content from step (e).

6. The method of claim 2, including the step of recovering a liquid ammonia product as a portion of the ammonia stream from step (e).

7. The method of claim 2, including the step of recovering a liquid ammonia product as a portion of the ammonia stream from step (c).

8. The method of claim 2, comprising the step of:
   (f) cooling a syngas makeup stream for the introducing step (a) in heat exchange against at least a portion of the syngas stream of reduced ammonia content from step (e).

9. The method of claim 8, including the step of separating water from a raw syngas makeup stream to form the syngas makeup stream for cooling in step (f).

10. The method of claim 9, wherein the water separation step includes the steps of;
    (1) cooling the raw syngas makeup stream to substantially condense water vapor and produce a water-lean stream;
    (2) contacting the water-lean stream from step (1) with aqueous ammonia, liquid ammonia or loop syngas; and
    (3) separating aqueous ammonia from the mixture from step (2) to produce a chilled, essentially water-free syngas makeup stream for the ammonia introduction step (a).

11. The method of claim 2, wherein step (a) is effected in an ammonia injection line, step (b) is effected in a high pressure condenser, step (c) is effected in a low pressure separator, step (d) is effected in a syngas compressor, and step (e) is effected in a high pressure separator which produces the liquid ammonia stream for supply via the ammonia injection line.

12. The method of claim 11, wherein the low pressure separator and the syngas compressor comprise:

a first ammonia knock-out drum for receiving the mixed vapor-liquid refrigerant stream from the high pressure condenser to separate a first portion of ammonia as condensate from the mixed vapor-liquid stream and produce a low pressure vapor stream;

a low pressure compression stage for compressing the low pressure stream from the ammonia knock-out drum to form an intermediate pressure stream;

an intercooler for cooling the intermediate pressure stream;

a second ammonia knock-out drum receiving the intermediate pressure stream from the intercooler to separate ammonia condensate therefrom and form an intermediate pressure vapor stream;

a line for introducing ammonia-containing recycle syngas product from the ammonia synthesis loop into the intermediate pressure vapor stream from the second ammonia knock-out drum and forming a combined syngas stream; and a high pressure compression stage for compressing the combined syngas stream to a pressure suitable for ammonia condensation in the high pressure condenser.

13. The method of claim 11, including a recycle line for recycling at least a portion of the ammonia stream from the low pressure separator as a supplemental cooling medium in the high pressure condenser.

14. The method of claim 11, including a secondary high pressure condenser for condensing ammonia from a portion of the high pressure, ammonia-containing syngas stream by heat exchange with the vapor stream of reduced ammonia content from the high pressure separator, and a line for supplying the condensate-containing syngas from the secondary high pressure condenser to the high pressure separator.

15. The method of claim 11, including a line for recovering a liquid ammonia product as a portion of the ammonia stream from the high pressure separator.

16. The method of claim 11, including a line for recovering a liquid ammonia product as a portion of the ammonia stream from the low pressure separator.

17. The method of claim 13, including a heat exchanger for cooling the syngas makeup stream for the ammonia injection in heat exchange with the syngas vapor stream from the high pressure separator for feed to the synthesis loop.

18. The method of claim 17, including a water separation unit for separating water from a raw syngas makeup stream to form the syngas makeup stream for feed to the heat exchanger.

19. The method of claim 18, wherein the water separation unit includes:

an upstream cooler for cooling raw syngas to substantially condense water vapor and produce a makeup stream of reduced water content;

an aqueous ammonia injection line for injecting aqueous ammonia into the makeup stream from the upstream cooler; and an aqueous ammonia separator for separating aqueous ammonia from the makeup stream and producing an essentially water-free makeup stream for feed to the heat exchanger.

20. The method of claim 1, wherein the vapor in the refrigerant stream from step (a) comprises at least 1 mole percent ammonia.

21. The method of claim 1, wherein the high pressure syngas stream cooled in step (b) is at a pressure between 10 and 22 MPa.

* * * * *

UNITED STATES PATENT AND TRADEMARK OFFICE
CERTIFICATE OF CORRECTION

PATENT NO. : 5,484,582
DATED : January 16, 1996
INVENTOR(S) : Jing M. Lee

It is certified that error appears in the above-indentified patent and that said Letters Patent is hereby corrected as shown below:

On the title page, item [56]:

In the references cited, delete "4,594,333" and insert —4,594,233— in its place.

In column 3, line 20, delete "-" following —portion—.

In column 6, line 55, delete the word "examples" and insert the word —example— in its place.

Col. 7, In claim 1, first line, delete the word "process" and insert the word —method— in its place.

Signed and Sealed this

Twenty-first Day of May, 1996

*Attest:*

BRUCE LEHMAN

*Attesting Officer*  *Commissioner of Patents and Trademarks*